United States Patent
Yoong et al.

(10) Patent No.: US 7,171,821 B2
(45) Date of Patent: Feb. 6, 2007

(54) TEMPERATURE CONTROL UNIT HAVING A VENT ARRANGEMENT

(75) Inventors: Hammond Yoong, Minneapolis, MN (US); Kristian Ehrhorn, Odense S (DK)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/835,812

(22) Filed: Apr. 30, 2004

(65) Prior Publication Data

US 2005/0241326 A1 Nov. 3, 2005

(51) Int. Cl.
F25D 17/04 (2006.01)
F24F 7/00 (2006.01)

(52) U.S. Cl. ..................... 62/186; 236/49.3
(58) Field of Classification Search ............... 62/129, 62/131, 178, 180, 186; 236/49.3; 454/256
See application file for complete search history.

(56) References Cited

U.S. PATENT DOCUMENTS

| | | | |
|---|---|---|---|
| 3,315,730 A | 4/1967 | Weaver et al. | |
| 3,563,757 A | 2/1971 | Dixon | |
| 3,699,870 A | 10/1972 | Cantagallo et al. | |
| 4,023,947 A | 5/1977 | Ferry | |
| 4,175,401 A | 11/1979 | McManus | |
| 4,178,770 A | 12/1979 | Fox | |
| 4,257,240 A | 3/1981 | Christiansen et al. | |
| 4,293,027 A | 10/1981 | Tepe et al. | |
| 4,320,628 A | 3/1982 | Okajima | |
| 4,347,712 A | 9/1982 | Benton et al. | |
| 4,358,050 A * | 11/1982 | Naganoma et al. ........... 236/13 |
| 4,391,320 A | 7/1983 | Inoue et al. | |
| 4,463,801 A | 8/1984 | Yoshimi et al. | |
| 4,640,183 A | 2/1987 | Doi | |
| 4,642,996 A | 2/1987 | Harris et al. | |
| 4,671,073 A | 6/1987 | Ohi | |
| 4,716,739 A | 1/1988 | Harris et al. | |
| 4,987,745 A | 1/1991 | Harris | |
| 5,063,753 A | 11/1991 | Woodruff | |
| 5,355,781 A | 10/1994 | Liston et al. | |
| 5,457,963 A | 10/1995 | Cahill-O'Brien et al. | |

(Continued)

FOREIGN PATENT DOCUMENTS

GB 1132152 10/1968

(Continued)

OTHER PUBLICATIONS

Advertisment entitled "Carrier Transicold AutoFresh," 2001.

(Continued)

*Primary Examiner*—Marc Norman
(74) *Attorney, Agent, or Firm*—Michael Best & Friedrich LLP (57) ABSTRACT

Some constructions of the present invention provide a vent arrangement for a transport temperature control unit including a refrigeration circuit and being mountable on a transport container having a load space. The vent arrangement can include a duct communicating between the load space and atmosphere and extending across at least a portion of the refrigeration circuit, a shutter located along the duct and movable with respect to the duct between a closed position, in which the shutter prevents air flow through the duct, and a plurality of opened positions, and a sensor positioned adjacent to the shutter and operable to record shutter position data.

22 Claims, 8 Drawing Sheets

U.S. PATENT DOCUMENTS

| | | |
|---|---|---|
| 5,515,693 A | 5/1996 | Cahill-O'Brien et al. |
| 5,590,540 A | 1/1997 | Ikeda et al. |
| 5,720,181 A | 2/1998 | Karl et al. |
| 5,749,236 A | 5/1998 | Tavian et al. |
| 5,799,495 A | 9/1998 | Gast, Jr. et al. |
| 5,801,317 A | 9/1998 | Liston et al. |
| 5,872,721 A | 2/1999 | Huston et al. |
| 6,318,096 B1 * | 11/2001 | Gross et al. .................. 62/122 |
| 6,431,457 B1 * | 8/2002 | Dirkes, II .................... 236/11 |
| 6,457,402 B1 | 10/2002 | Parker et al. |
| 6,471,136 B1 | 10/2002 | Chatterjee et al. |
| 6,595,847 B1 | 7/2003 | Freese et al. |
| 6,763,677 B1 | 7/2004 | Burchill et al. |

FOREIGN PATENT DOCUMENTS

| | | |
|---|---|---|
| WO | WO 00/31478 | 6/2000 |

OTHER PUBLICATIONS

Article entitled "New AutoFresh™ Feature: Automates Fresh Air Exchange for XTC Units," The Extra Mile, p. 5, 2003.

* cited by examiner

TEMPERATURE CONTROL UNIT HAVING A VENT ARRANGEMENT

BACKGROUND OF THE INVENTION

Temperature control units generally include a refrigeration circuit having a compressor, a condenser, and an evaporator, all which cooperate to alter the temperature and pressure of a refrigerant. In transport applications, temperature control units are commonly mounted on a straight truck, a tractor-trailer combination, a container, a railcar, and the like to condition a load space. Typically, atmospheric air is drawn into the temperature control unit through one or more ducts. The atmospheric air is then conditioned (e.g., cooled, heated, dehumidified, etc.) and is vented into the load space to maintain and/or achieve the desired load space temperature. In some cases, load space air is also vented to the atmosphere through one or more ducts.

SUMMARY OF THE INVENTION

Some constructions of the present invention provide a vent arrangement for a transport temperature control unit including a refrigeration circuit and being mountable on a transport container having a load space. The vent arrangement can include a duct communicating between the load space and atmosphere and extending across at least a portion of the refrigeration circuit, a shutter located along the duct and movable with respect to the duct between a closed position, in which the shutter prevents air flow through the duct, and a plurality of opened positions, and a sensor positioned adjacent to the shutter and operable to record shutter position data.

Other constructions of the present invention provide a vent arrangement for a transport temperature control unit, the transport temperature control unit having a housing and being mountable on a transport container having a load space. The vent arrangement can include a duct extending through the housing and communicating between the load space and atmosphere, a first shutter located along the duct and being movable with respect to the duct between a plurality of positions, the first shutter defining an aperture, a second shutter defining an aperture and being pivotably coupled to the first shutter for movement between an opened position, in which the apertures of the first and second shutters are aligned, and a closed position, in which the apertures of the first and second shutters are misaligned, and a sensor operable to record position data corresponding to the position of one of the first shutter and the second shutter.

The present invention also provides a method of operating a vent arrangement for a temperature control unit, the temperature control unit being mountable on a transport container having a load space, the vent arrangement including a duct communicating between the load space and atmosphere, a memory unit, and a shutter movably coupled to the housing and positioned along the duct. The method includes the acts of providing a sensor in communication with the memory unit, at least a portion of the sensor being secured to the shutter for movement with the shutter, positioning the shutter in a closed position, in which the shutter prevents air flow through the duct, recording the shutter position with the sensor, transmitting shutter position data from the sensor to the memory unit, moving the shutter from the closed position toward an opened position, recording the shutter position with the sensor, and transmitting shutter position data from the sensor to the memory unit.

Further aspects of the present invention, together with the organization and operation thereof, will become apparent from the following detailed description of the invention when taken in conjunction with the accompanying drawings, wherein like elements have like numerals throughout the drawings.

Before at least one construction of the invention is explained in detail, it is to be understood that the invention is not limited in its application to the details of the construction and the arrangements of the components set forth in the following description or illustrated in the drawings. The invention is capable of other constructions and of being practiced or being carried out in various ways. In addition, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and variations thereof herein are used broadly and encompass direct and indirect connections and couplings. In addition, the terms "connected" and "coupled" and variations thereof are not restricted to physical or mechanical connections or couplings.

DETAILED DESCRIPTION

FIGS. 1–4 illustrate a temperature control unit 10 having a vent arrangement 12 according to the present invention. The temperature control unit 10 is suitable for use in transport applications and can be mounted on a straight truck, a tractor-trailer combination, a shipping container, a railcar, and any other transport container.

The temperature control unit 10 includes a housing 14 having top and bottom walls 16, 18 and opposite side walls 20, 22. In some constructions, such as the illustrated construction of FIG. 2, the temperature control unit 10 includes an evaporator 24, a compressor 28, and a condenser 30 located in respective upper, lower, and central portions of the housing 14 and fluidly connected along a refrigeration circuit 31. In other constructions (not shown), one or more of the evaporator 24, compressor 28, and condenser 30 can have alternative relative orientations (e.g., horizontally or vertically in-line or spaced throughout the housing 14) and locations within the housing 14 (e.g., the condenser 30 can be located in an upper portion of the housing 14, the compressor 28 can be located in a central portion of the housing 14, and the evaporator 24 can be located in a lower portion of the housing 14). In still other constructions (not shown), the temperature control unit 10 can include alternate refrigeration systems (e.g., the temperature control unit 10 can include a cryogenic refrigeration system). In these constructions, the temperature control unit 10 can include a cryogen storage tank instead of or in addition to the compressor 28 and condenser 30.

Figure 1:
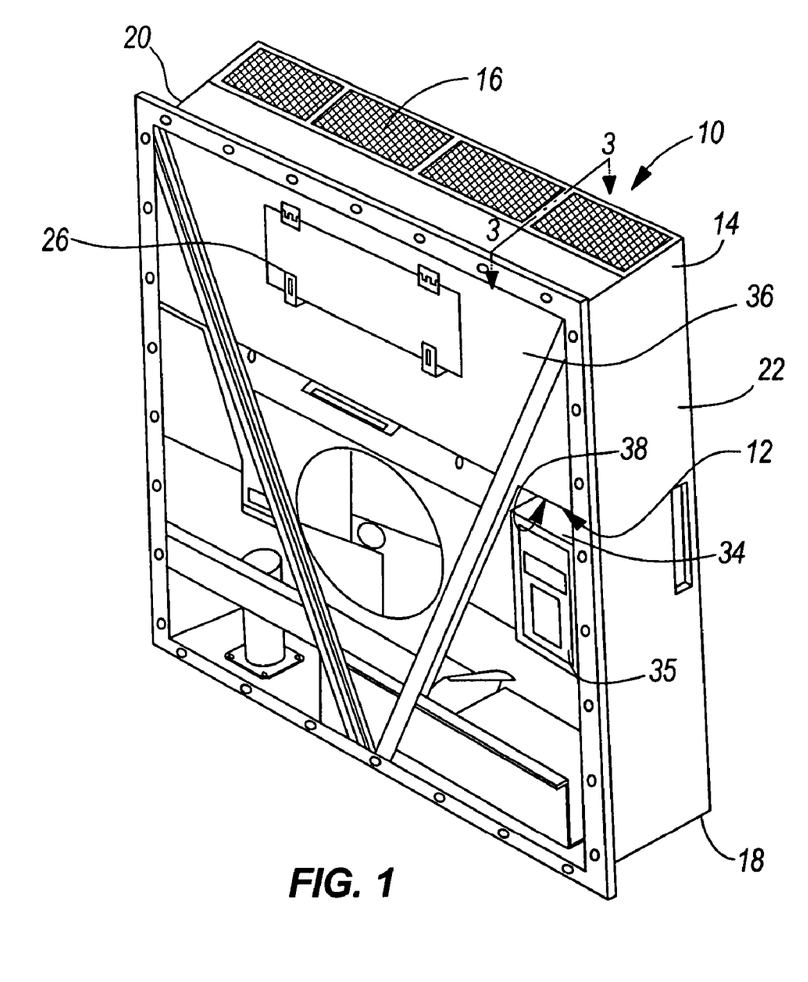
FIG. 1 is a front perspective view of a transport temperature control unit having a vent arrangement embodying aspects of the present invention.
Figure 2:
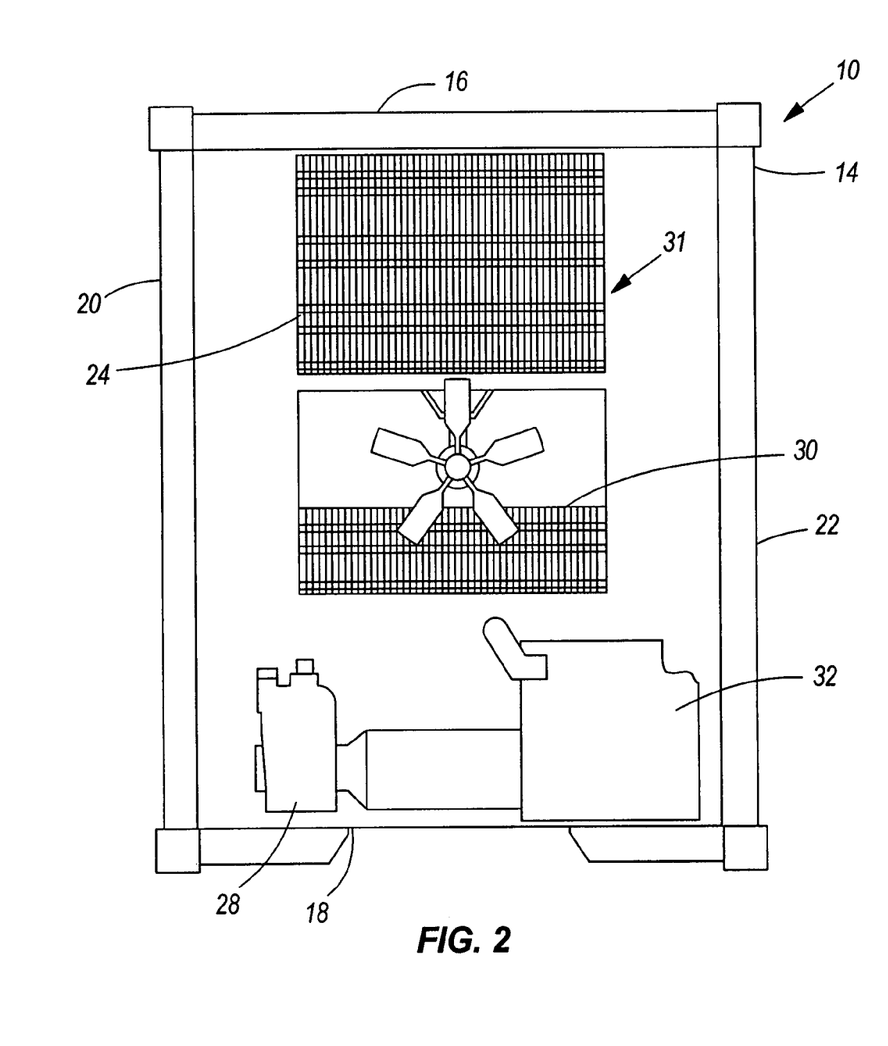
FIG. 2 is a rear view of the transport temperature control unit shown in FIG. 1.

With continued reference to FIG. 2, the temperature control unit 10 can also include a power source or prime mover 32 (e.g., an internal-combustion engine, an electric motor, an electric motor-alternator, a battery, a fuel cell, etc., and combinations thereof) and a controller 34 (shown in FIGS. 1 and 4) in electrical communication with the prime mover 32. An operator control panel 35 (shown in FIGS. 1 and 4) is located along a front wall 36 of the housing 14. As explained below, the control panel 35 is in communication with the controller 34 so that an operator can change system parameters, review recorded data, and upload or download data in a conventional manner.

A recess 38 extends through a portion of the front wall 36 of the housing 14 and defines a vent cavity 40 having a rear wall 42, side walls 44, 46, an upper wall 48, and a bottom wall 50. In the illustrated construction, the vent cavity 40 is located on one side of the front wall 36 above the control panel 35. However, in other constructions (not shown), the vent cavity 40 can be located in other locations along the front wall 36, or alternatively, can be located along any one of the other walls 16, 18, 20, 22 of the temperature control unit 10.

Figure 3:
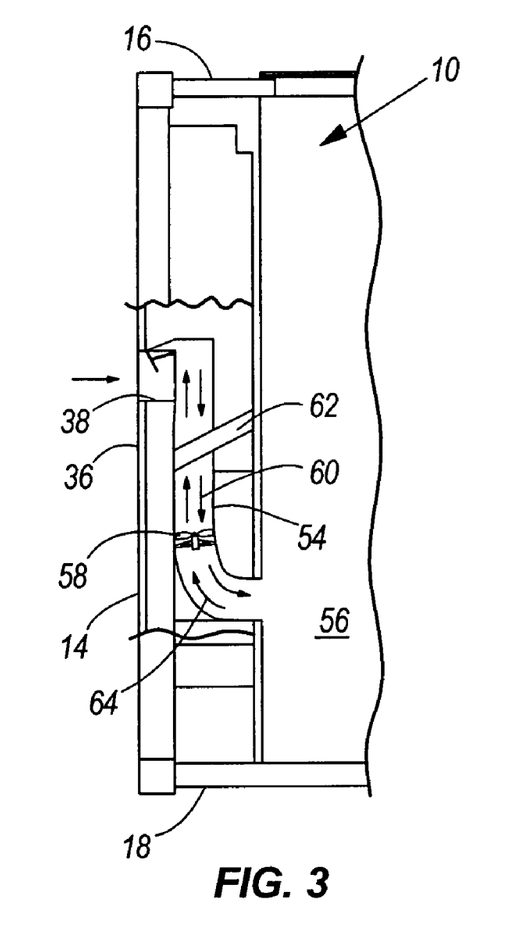
FIG. 3 is a cross sectional view of the transport temperature control unit shown in FIG. 1 taken along line III—III.
Figure 4:
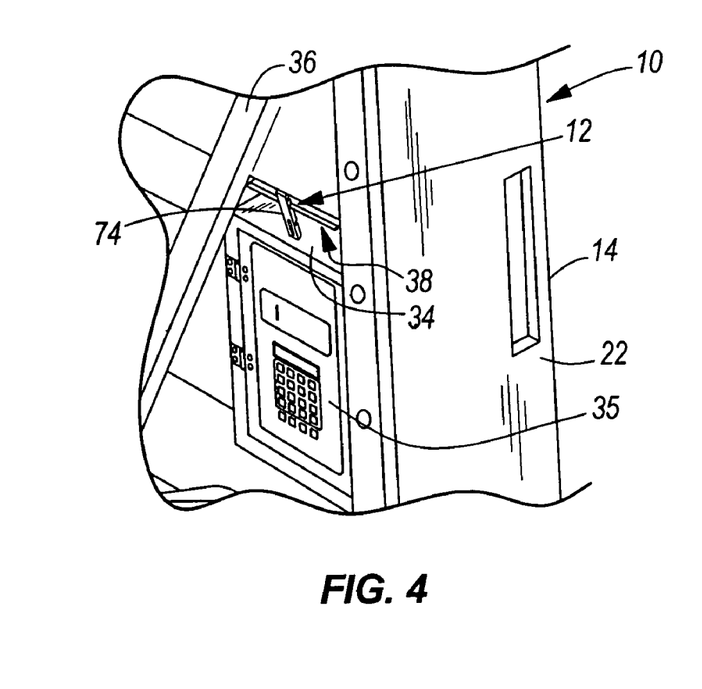
FIG. 4 is an enlarged front perspective view of a portion of the transport temperature control unit shown in FIG. 1.

As shown in FIG. 3, the vent arrangement 12 includes a duct 54, which communicates between the atmosphere and a load space 56. In the illustrated construction, one end of the duct 54 opens into the vent cavity 40 and an opposite end of the duct 54 extends through a rearward side of the housing 14 of the temperature control unit 10. In other constructions (not shown), the vent arrangement 12 can include two or more ducts 54, or alternatively, the vent arrangement 12 can include a single duct divided into two or more sections. In these constructions one duct 54 or a section of one duct 54 can provide air flow from the atmosphere into the load space 56 and another duct or another section of a duct 54 can provide air flow from the load space 56 to the atmosphere.

In some constructions, fans 58 draw air along a first flow path (represented by arrows 60 in FIG. 3), which extends through the duct 54 and across evaporator coils 62. In these constructions, the air can be cooled by contact with the evaporator coils 62 before entering the load space 56. Alternatively, atmospheric air can enter the load space 56 through the duct 54 without being cooled by contact with the evaporator coils 62.

In other constructions (not shown), one or more heating elements (e.g., heating coils, propane-fueled burners, and the like) can be located along the flow path 60 for heating atmospheric air before the air enters the load space 56. In still other constructions, warm refrigerant can be directed through the evaporator coils 62 to warm the air traveling along the flow path 60.

In other constructions, load space air can be vented to the atmosphere through the duct 54 along a second flow path (represented by arrows 64 in FIG. 3). Venting of load space air to the atmosphere is particularly desirable when transporting perishable loads, such as, for example, produce, flowers, plants, and the like. Generally, such perishable loads generate waste gases, which accumulate in the load space 56. Over time, these waste gases can reduce the useful life and/or cause damage to loads.

As shown in FIGS. 5–8, the vent arrangement 12 can include a shutter or vent door 68. As used herein and in the appended claims the term "shutter" includes any cover, slide, lid, door, or plate, for covering or substantially covering an opening or for controlling movement through or movement toward an opening. The vent door 68 is pivotably connected to the rear wall 42 of the vent cavity 40 for pivoting movement relative to the rear wall 42 between a closed position (shown in FIG. 7), in which the vent door 68 is adjacent to the upper wall 48, a first opened position (shown in FIG. 8), in which the vent door 68 is spaced a distance from the upper wall 48, and a number of intermediate opened positions (not shown) between the first opened position and the closed position.

Figure 8:
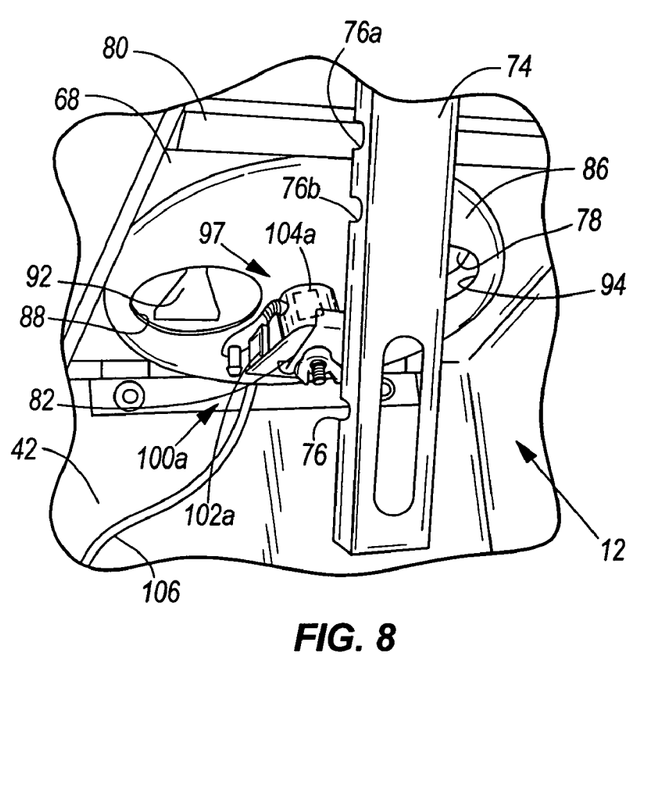
FIG. 8 is an enlarged front view of a portion of the vent arrangement shown in FIG. 1 with the arm in a lowered position.
Figure 9:
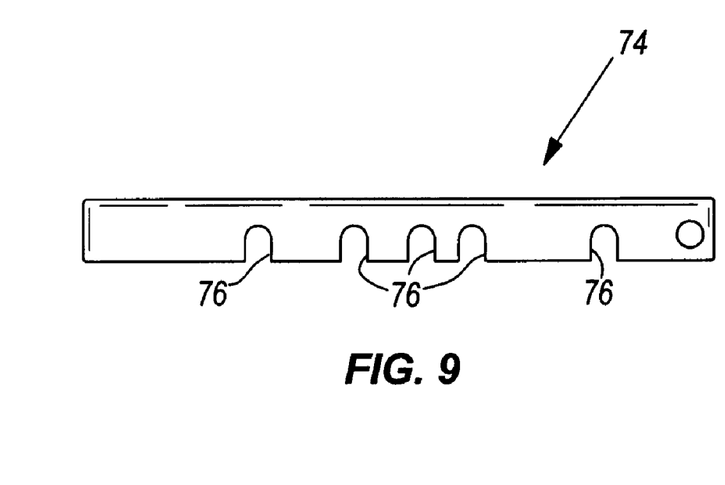
FIG. 9 is an enlarged side view of the arm shown in FIG. 7.

A mounting bracket 70 (shown in FIG. 7) is secured to the upper wall 48 of the vent cavity 40 and supports a vent arm or vent lever 74 for pivoting movement with respect to the upper wall 48. As shown in FIGS. 8 and 9, a number of notches 76 (five in the illustrated construction of FIG. 9) are located along the length of the vent arm 74. Each of the notches 76 corresponds to a different opened position of the vent door 68. For example, when the forward edge 80 of the vent door 68 is engaged in a first notch 76a, the vent arm 74 supports the vent door 68 in the first opened position corresponding to a first air flow through the vent arrangement 12. Similarly, when the forward edge 80 of the vent door 68 is engaged in a second notch 76b, the vent arm 74 supports the vent door 68 in a second opened position corresponding to a second air flow through the vent arrangement 12.

When the vent door 68 is in the closed position, the vent arm 74 can be moved to a secured position (shown in FIG. 7), in which the vent arm 74 is pivoted upwardly toward the upper wall 48 of the vent cavity 40. A vent clamp 82 secures the vent arm 74 and the vent door 68 in the secured and closed positions, respectively. In these positions, the vent door 68 and the vent arm 74 prevent or limit air flow through the duct 54.

Figure 5:
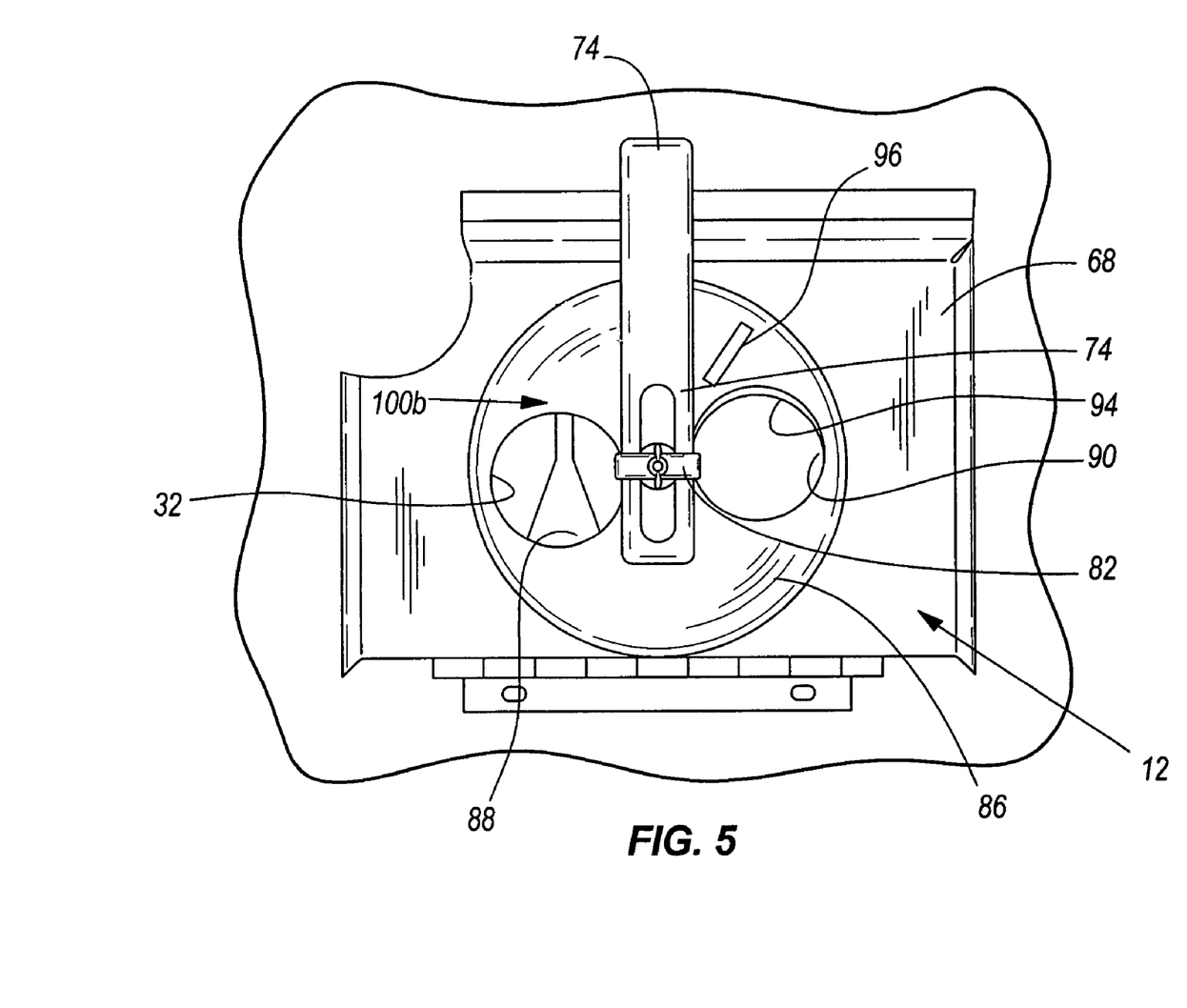
FIG. 5 is an enlarged front view of a portion of the vent arrangement shown in FIG. 1.
Figure 6:
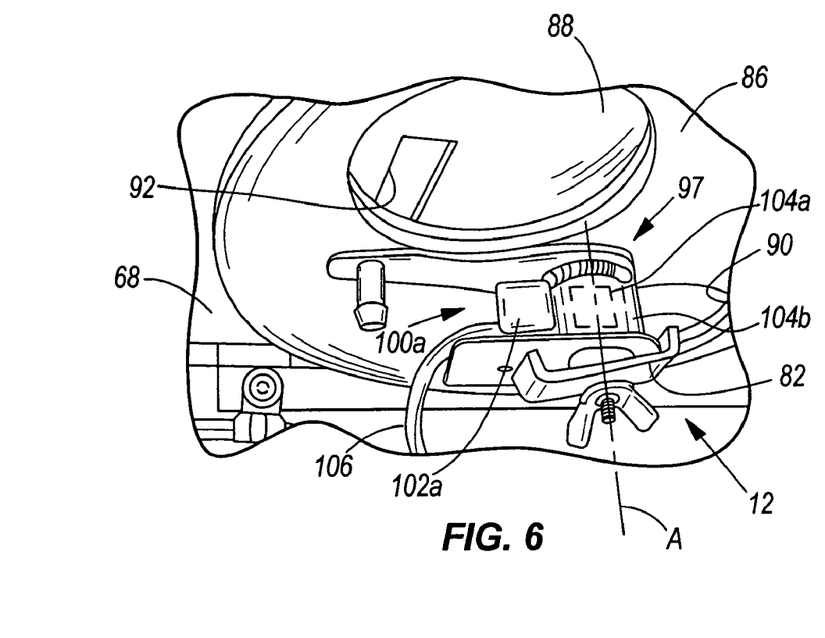
FIG. 6 is an enlarged front view of a portion of the vent arrangement shown in FIG. 1 with the arm removed.
Figure 7:
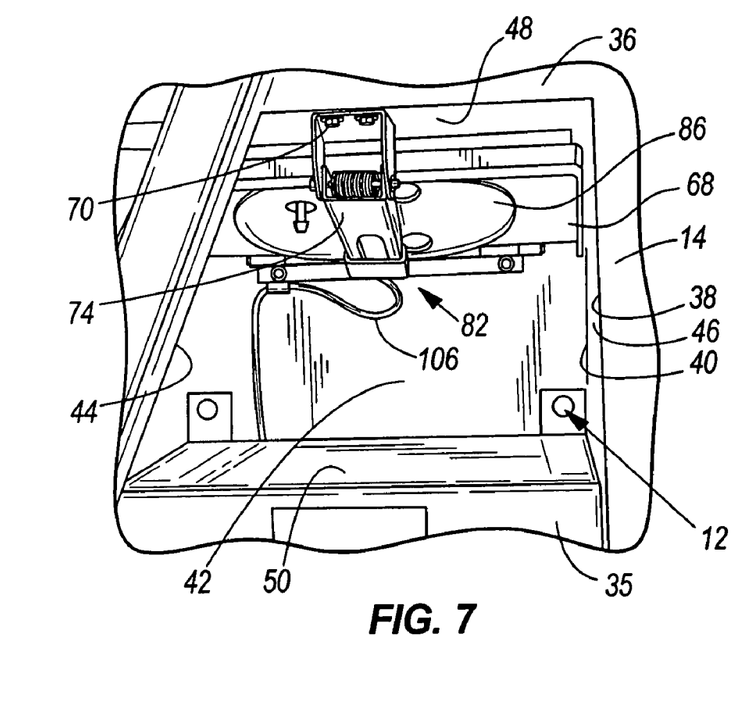
FIG. 7 is an enlarged front view of a portion of the vent arrangement shown in FIG. 1 with the door in the closed position and the arm in a secured position.

In some constructions, such as the illustrated construction of FIGS. 1–8, the vent arrangement 12 also includes a second shutter or vent plate 86. In these constructions, the vent plate 86 is mounted on the vent door 68 for pivoting movement about an axis A (shown in FIG. 6). As shown in FIGS. 5, 6, and 8, two vent openings 88, 90 extend axially through the vent plate 86 and are spaced circumferentially around the vent plate 86 by about 180 degrees. The vent plate 86 is moveable between opened positions, in which one or both of the vent openings 88, 90 are aligned with corresponding openings 92, 94 in the vent door 68, and a closed position, in which the vent openings 88, 90 of the vent plate 86 and the vent openings 92, 94 of the vent door 68 are misaligned to prevent or limit air flow through the vent plate 86 and the vent door 68.

In the illustrated construction of FIGS. 1–8, air flowing into the load space 54 along the first flow path 60 flows through vent openings 88 and 92 in the vent door 68 and the vent plate 86, respectively. Air flowing out of the load space 54 along the second flow path 64 flows through vent openings 90, 94 in the vent door 68 and the vent plate 86, respectively. In other constructions, air flowing along the first and second flow paths 60, 64 can flow through either or both of the vent openings 88, 90 in the vent door 68 and either or both of the vent openings 92, 94 in the vent plate 86.

The vent arrangement 12 controls and regulates air flow along the flow paths 60, 64 between the atmosphere and the load space 56 during venting, heating, and cooling operations. More particularly, the vent door 68 can be moved to the closed position to prevent or limit air flow through the duct 54 and along the flow paths 60, 64 during venting, heating, and cooling operations. For example, in applications in which the load space 56 houses frozen loads (e.g., ice, frozen deserts, etc.), the vent door 68 can be secured in the closed position to prevent or limit air exchange between the atmosphere and the load space 56. Alternatively, the vent door 68 can be moved to one of the opened positions to regulate air flow through the duct 54 and along the flow paths 60, 64 during venting, heating, and cooling operations.

Alternatively or in addition, the vent plate 86 can be pivoted toward the closed position to prevent or limit air flow through the duct 54 and along the flow paths 60, 64 during venting, heating, and cooling operations, or alternatively, the vent plate 86 can be pivoted toward one of the opened positions to regulate air flow through the duct 54 and along the flow paths 60, 64 during venting, heating, and cooling operations.

In constructions, such as the illustrated construction of FIGS. 1–8, in which the vent arrangement 12 includes a vent plate 86 and a vent door 68, the vent plate 86 and the vent door 68 can cooperate to provide a number of different air flows through the duct 54. For example, the vent plate 86 and the vent door 68 can both be moved toward respective closed positions to provide a first air flow (i.e., no air flow) through the duct 54. Alternatively, the vent door 68 can be moved toward the first opened position and the vent plate 86 can be moved toward the closed position to provide a second air flow. To provide a third or maximum air flow, the vent door 68 and the vent plate 86 can both be moved toward respective opened positions.

In the illustrated construction, the vent door 68 and the vent plate 86 positions are selected by an operator at the beginning of a trip (i.e., the vent door 68 and the vent plate 86 are manually operated). In other constructions, the vent door 68 and the vent plate 86 positions are controlled by the controller 34 and can be adjusted during a trip (e.g., once every hour, once every day, etc.), or alternatively, between trips. In still other constructions, the position of one of the vent door 68 and the vent plate 86 can be selected by the operator (i.e., the vent plate 86 can be manually operated) and the position of the other of the vent door 68 and the vent plate 86 can be controlled by the controller 34 (e.g., the vent door 68).

To move the vent door 68 of the illustrated construction of FIGS. 1–8 toward one of the opened positions, the operator unlocks the vent clamp 82 and pivots the vent arm 74 downwardly. The operator then pivots the vent door 68 downwardly toward the desired position and engages the forward edge 80 of the vent door 68 in the notch (e.g., notch 76*b*) corresponding to the desired vent door position (e.g., one of the intermediate opened positions) to secure the vent door 68 in the desired position. Alternatively, the operator can secure the vent door 68 in the closed position by pivoting the vent door 68 upwardly toward the closed position, pivoting the vent arm 74 upwardly toward the upper wall 48 of the vent cavity 40, and securing the vent door 68 and the vent arm 74 to the upper wall 48 of the vent cavity 40 with the vent clamp 82.

As explained above, the vent plate 86 can be pivoted about the axis A to adjust air flow through the duct 54. In constructions in which the controller 34 controls the position of the vent plate 86, the vent arrangement 12 can include a drive arrangement (not shown), such as a stepper motor, which pivots the vent plate 86 about the axis A between the opened and closed positions. In constructions having a drive arrangement, a communication line extends between the drive system and the controller 34 for conveying signals between the controller 34 and the drive arrangement. In other constructions, an operator can manually pivot the vent plate 86 about the axis A between respective opened and closed positions. As shown in FIG. 5, in some constructions of the present invention, the vent arrangement 12 includes a handle 96 positioned on the vent plate 86 to facilitate pivoting movement of the vent plate 86 about the axis A.

In some constructions, one or both of the vent door 68 and the vent plate 86 can have a default position. For example, as shown in the illustrated construction of FIGS. 1–8, the vent arrangement 12 can include a biasing arrangement 97, such as a spring or a camming arrangement, for biasing the vent plate 86 toward one of the vent plate positions (e.g., the opened position). In these constructions, the biasing arrangement 97 can move the vent plate 86 toward the opened position upon movement of the vent door 68 toward the opened position.

In some constructions, the controller 34 monitors and regulates the operation of the vent arrangement 12 and the elements of the refrigeration circuit 31 (e.g., the evaporator 24, the compressor 28, condenser 30, expansion valve, etc.) based upon programmed operational parameters and system settings. In other constructions, the controller 34 records data corresponding to operation of the refrigeration circuit 31 and the vent arrangement 12. In these constructions, refrigeration circuit and vent arrangement data can be used to confirm load space conditions and to confirm the conditions of the load during transportation. For example, refrigeration circuit and vent arrangement data can be used to confirm that the load space temperature and/or humidity level was maintained within a desired range for the entire trip or for a portion of the trip. Similarly, the vent arrangement data can be used to confirm whether or not the load space air was changed by venting and/or how frequently the load space air was exchanged.

Figure 11A:
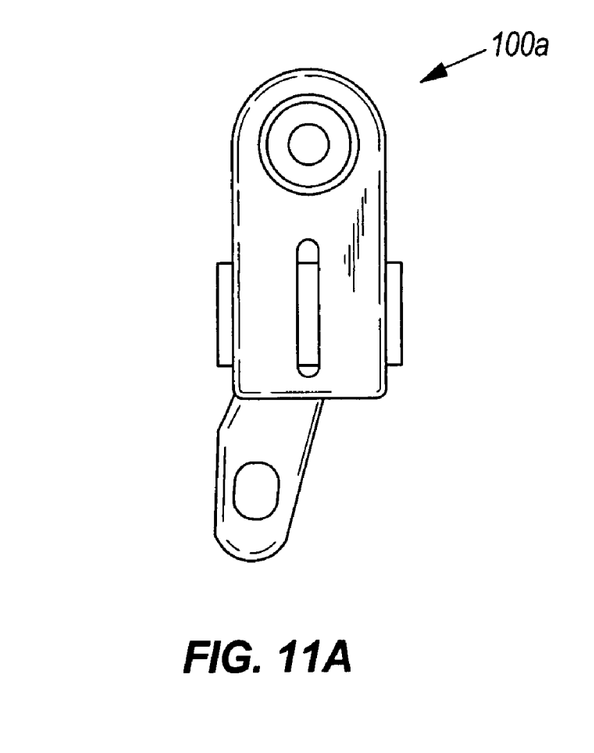
FIGS. 11A–11C illustrate a portion of a sensor of the vent arrangement shown in FIG. 1.
Figure 11B:
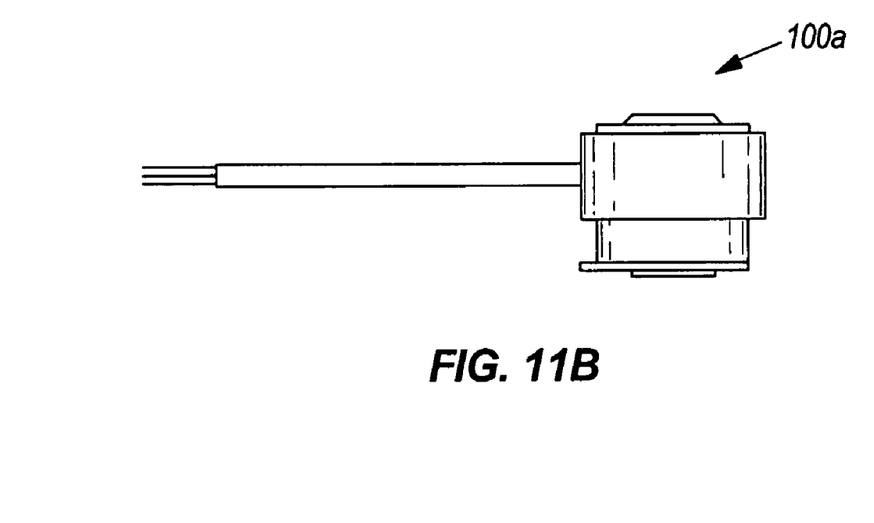
Figure 11C:
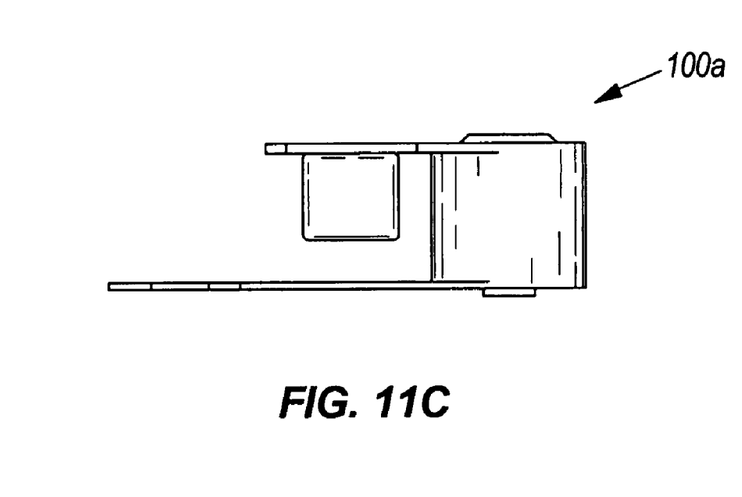

The vent arrangement 12 can also include one or more position sensors 100 for recording the position of the vent door 68 and/or the position of the vent plate 86. In the construction of FIG. 6, the vent arrangement 12 includes a vent plate position sensor 100*a* having a first sensing element 102*a* (also shown in FIGS. 11A–11C) and a second sensing element 104*a* for recording the position of the vent plate 86 and for transmitting the position data to the controller 34. In some constructions, the first sensing element 102*a* is a hall effect transducer and the second sensor 104*a* is a magnet. In such constructions, the first and second sensing elements 102*a*, 104*a* can be enclosed to protect the first and second sensing elements 102*a*, 104*a* from the environment (e.g., from the corrosive effects of saltwater spray, from debris, and from impacts). Moreover, constructions having a hall effect transducer and a magnet have been found to have a relatively long operational life because such constructions do not include inter-engaging elements, which can have a relatively short operational life. In other constructions, other conventional position sensing elements (e.g., photoelectric gates, position switches, etc.) can also or alternately be used.

In constructions having first and second sensing elements 102a, 104a, such as the illustrated construction of FIG. 6, one of the first and second sensing elements 102a, 104a can be supported on the vent plate 86 for pivoting movement with the vent plate 86 about the axis A and the other of the first and second sensing elements 102a, 104a can be stationary. In this manner, the vent plate position sensor 100a operates by measuring the relative distance between the sensing elements 102a, 104a in a conventional manner and by sending the position data across a communication line 106 to the controller 34.

In some constructions, the vent arm 74 prevents the vent plate 86 from being pivoted toward one of the opened positions when the vent door 68 is in the closed position. In these constructions, the vent arrangement 12 can include a single position sensor 100, which records the relative position of the vent plate 86. In this manner, the controller 34 can be programmed to record an opened position for the vent door 68 when the sensor 100 records an opened position for the vent plate 86.

In other constructions, the vent arrangement 12 can include a vent door position sensor 100b, a portion of which can be supported on the vent door 68 or the vent plate 86 for determining the vent door position. In some constructions, the vent door position sensor 100b can be a tilt sensor and can be operable to determine the relative orientation of the vent door 68. In other constructions, other conventional position sensing elements (e.g., photoelectric gates, position switches, etc.) can also or alternately be used. Vent door position data from the vent door position sensor 100b is sent across a communication line (not shown) to the controller 34 where the vent door position is stored and logged for later retrieval.

Figure 10:
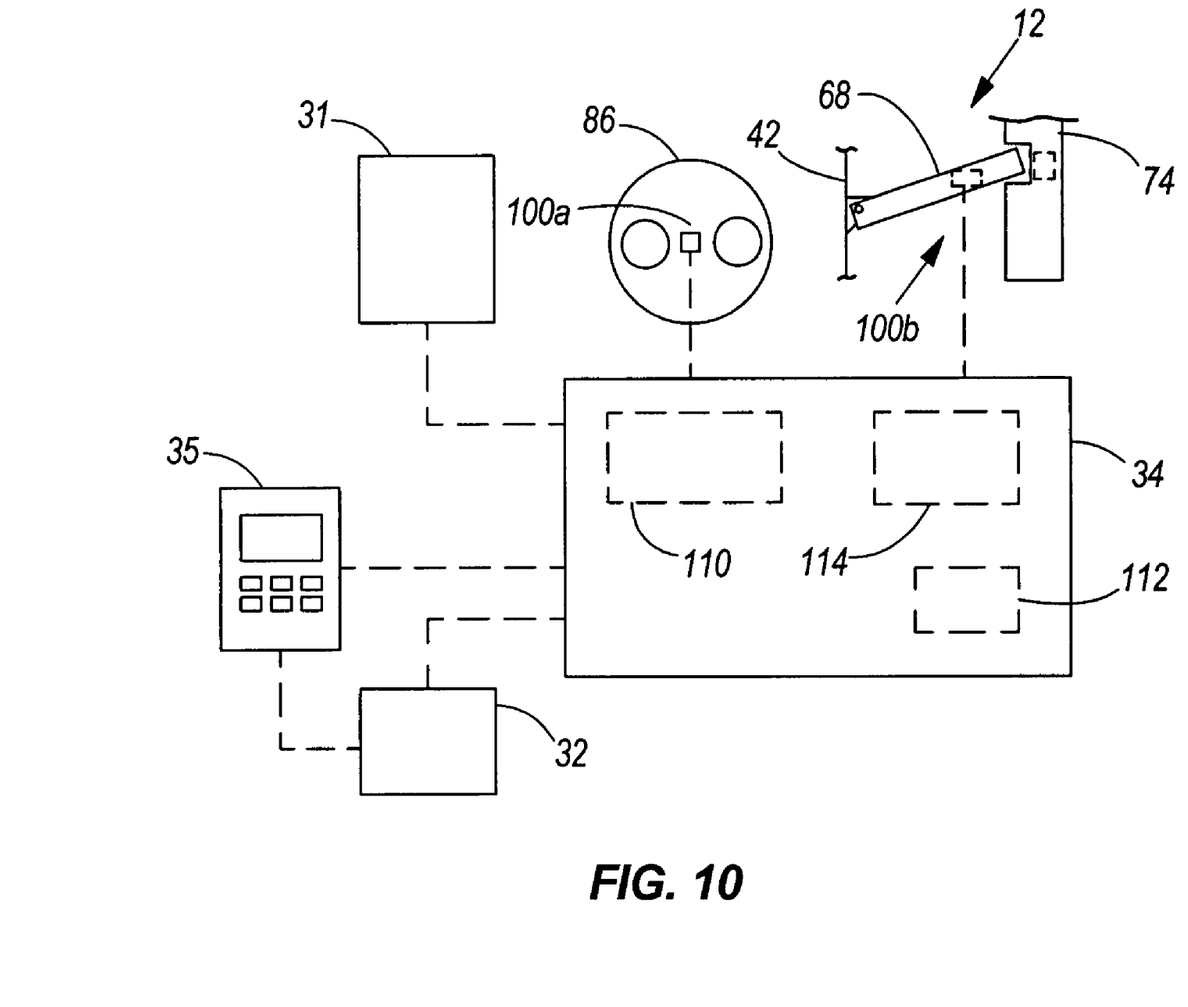
FIG. 10 is a schematic illustration of the transport temperature control unit and the vent arrangement shown in FIG. 1.

In some constructions, the controller 34 includes a timer 110 (schematically illustrated in FIG. 10) and a memory unit 112 (schematically illustrated in FIG. 10). In these constructions, the controller 34 can record vent door and/or vent plate position data and can record the length of time that the vent door 68 and/or vent plate 86 remain in a particular position. At the end of a trip, an operator can review the controller 34 records to document the location of the vent door 68 and the length of time the vent door 68 was maintained in a particular position and/or the operator can review the controller 34 records to document the location of the vent plate 86 and the length of time the vent plate 86 was maintained in a particular position. In this manner, the operator can document that the load space conditions were within a predetermined range during transportation of the load.

In some constructions, the controller 34 also includes a vent position alarm 114 (schematically illustrated in FIG. 10). In these constructions, the controller 34 can be programmed to include load specific parameters, including a required vent door and/or vent plate position. If the vent door 68 and/or vent plate 86 is moved toward a non-approved position or remains in a position for a non-approved time period, the vent position alarm 114 is activated to alert the operator.

One or more independent features of the present invention are set forth in the following claims.

What is claimed is:

1. A vent arrangement for a transport temperature control unit, the transport temperature control unit including a refrigeration circuit and being mountable on a transport container having a load space, the vent arrangement comprising:
a duct communicating between the load space and atmosphere and extending across at least a portion of the refrigeration circuit;
a shutter located along the duct and movable with respect to the duct between a closed position, in which the shutter prevents air flow through the duct, and a plurality of opened positions; and
a sensor positioned adjacent to the shutter and operable to record and log shutter position data;
wherein the temperature control unit includes a controller, the sensor being in communication with the controller to transmit the shutter position data to the controller;
wherein the controller includes a shutter position alarm, and wherein the controller is programmed with shutter position data corresponding to a preferred shutter position, the shutter position alarm alerting an operator when the shutter is outside the preferred position.

2. The vent arrangement of claim 1, wherein the controller includes a memory unit, the memory unit logging the shutter position data.

3. The vent arrangement of claim 1, wherein the controller includes a timer and a memory unit, the memory unit logging time data from the timer and coordinating the time data and the shutter position data.

4. The vent arrangement of claim 1, wherein the sensor includes a linear hall effect transducer.

5. The vent arrangement of claim 1, wherein the temperature control unit includes a housing, the duct extending through the housing, and wherein the shutter is pivotably coupled to the housing.

6. The vent arrangement of claim 5, further comprising
a second shutter pivotably coupled to the first shutter for movement with respect to the first shutter; and
second sensor positioned adjacent to the second shutter and being operable to record shutter position data corresponding to the position of the second shutter.

7. A vent arrangement for a transport temperature control unit, the transport temperature control unit including a refrigeration circuit and being mountable on a transport container having a load space, the vent arrangement comprising:
a duct communicating between the load space and atmosphere and extending across at least a portion of the refrigeration circuit;
a shutter located along the duct and movable with respect to the duct between a closed position, in which the shutter prevents air flow through the duct, and a plurality of opened positions; and
a sensor positioned adjacent to the shutter and operable to record and log shutter position data;
wherein the temperature control unit includes a housing, the refrigeration circuit extending through the housing, and further comprising an arm pivotably coupled to the housing and movable relative to the housing to support the shutter in at least one of the plurality of opened positions.

8. The vent arrangement of claim 7, wherein at least a portion of the sensor is positioned on the arm.

9. The vent arrangement of claim 7, wherein the arm is movable toward a securing position, in which the arm maintains the shutter in the closed position.

10. A vent arrangement for a transport temperature control unit, the transport temperature control unit having a housing and being mountable on a transport container having a load space, the vent arrangement comprising:
- a duct extending through the housing and communicating between the load space and atmosphere;
- a first shutter located along the duct and being movable with respect to the duct between a plurality of positions, the first shutter defining an aperture;
- a second shutter defining an aperture and being pivotably coupled to the first shutter for movement between an opened position, in which the apertures of the first and second shutters are aligned, and a closed position, in which the apertures of the first and second shutters are misaligned; and
- a sensor operable to record position data corresponding to the position of one of the first shutter and the second shutter.

11. The vent arrangement of claim 10, wherein the plurality of positions of the first shutter includes a closed position, in which the first shutter limits air flow through the duct.

12. The vent arrangement of claim 10, wherein the temperature control unit includes a controller, the sensor being in communication with the controller to transmit shutter position data to the controller.

13. The vent arrangement of claim 12, wherein the controller includes a memory unit, the memory unit logging the shutter position data.

14. The vent arrangement of claim 12, wherein the controller includes a timer and a memory unit, the memory unit logging time data from the timer and coordinating the time data and the shutter position data.

15. The vent arrangement of claim 12, wherein the controller includes a shutter position alarm, and wherein the controller is programmed with shutter position data corresponding to a preferred shutter position, the shutter position alarm alerting an operator when the first shutter is outside the preferred position.

16. The vent arrangement of claim 10, wherein the sensor includes a linear hall effect transducer.

17. The vent arrangement of claim 10, further comprising an arm pivotably coupled to the housing and movable relative to the housing to support the first shutter in at least one of the plurality of positions.

18. The vent arrangement of claim 17, wherein at least a portion of the sensor is positioned on the arm.

19. The vent arrangement of claim 17, wherein the arm is movable toward a securing position, in which the arm maintains the first shutter in a closed position, in which the first shutter limits air flow through the duct.

20. A method of operating a vent arrangement for a temperature control unit, the temperature control unit being mountable on a transport container having a load space, the vent arrangement including a duct communicating between the load space and atmosphere, a memory unit, and a shutter movably coupled to the housing and positioned along the duct, the method comprising:
- providing a sensor in communication with the memory unit, at least a portion of the sensor being secured to the shutter for movement with the shutter;
- positioning the shutter in a closed position, in which the shutter prevents air flow through the duct;
- recording the shutter position with the sensor;
- transmitting shutter position data from the sensor to the memory unit;
- moving the shutter from the closed position toward an opened position;
- recording the shutter position with the sensor;
- transmitting shutter position data from the sensor to the memory unit;
- providing an arm pivotably coupled to the housing, at least a portion of the sensor being supported on the arm;
- pivoting the arm into engagement with the shutter; and
- supporting the shutter in the first position with the arm.

21. A method of operating a vent arrangement for a temperature control unit, the temperature control unit being mountable on a transport container having a load space, the vent arrangement including a duct communicating between the load space and atmosphere, a memory unit, and a shutter movably coupled to the housing and positioned along the duct, the method comprising:
- providing a sensor in communication with the memory unit, at least a portion of the sensor being secured to the shutter for movement with the shutter;
- positioning the shutter in a closed position, in which the shutter prevents air flow through the duct;
- recording the shutter position with the sensor;
- transmitting shutter position data from the sensor to the memory unit;
- moving the shutter from the closed position toward an opened position;
- recording the shutter position with the sensor; and
- transmitting shutter position data from the sensor to the memory unit;
- wherein the first shutter defines an aperture, and wherein the vent arrangement includes a second shutter pivotably coupled to the first shutter and defining an aperture, the method further comprising pivoting the second shutter with respect to the first shutter to align the first and second apertures.

22. The method of claim 21, wherein the vent arrangement includes a second sensor in communication with the memory unit, at least a portion of the second sensor being secured to the second shutter for movement with the second shutter, the method further comprising:
- recording the second shutter position with the second sensor; and
- transmitting the second shutter position data from the second sensor to the memory unit.

* * * * *

UNITED STATES PATENT AND TRADEMARK OFFICE
CERTIFICATE OF CORRECTION

| | | |
|---|---|---|
| PATENT NO. | : 7,171,821 B2 | |
| APPLICATION NO. | : 10/835812 | |
| DATED | : February 6, 2007 | |
| INVENTOR(S) | : Hammond Yoong and Kristian Ehrhorn | |

It is certified that error appears in the above-identified patent and that said Letters Patent is hereby corrected as shown below:

On the title page item (56), Under FOREIGN PATENT DOCUMENTS, insert --GB 1132151 10/1968--.

Signed and Sealed this

Eighth Day of May, 2007

JON W. DUDAS
*Director of the United States Patent and Trademark Office*